(12) United States Patent
Bowman et al.

(10) Patent No.: US 11,856,013 B2
(45) Date of Patent: Dec. 26, 2023

(54) METHOD AND SYSTEM FOR DETECTING LATERAL MOVEMENT IN ENTERPRISE COMPUTER NETWORKS

(71) Applicant: The George Washington University, Washington, DC (US)

(72) Inventors: Benjamin Bowman, Kensington, MD (US); Craig Laprade, Fairfax, VA (US); H. Howie Huang, McLean, VA (US)

(73) Assignee: The George Washington University, Washington, DC (US)

( * ) Notice: Subject to any disclaimer, the term of this patent is extended or adjusted under 35 U.S.C. 154(b) by 248 days.

(21) Appl. No.: 16/915,183

(22) Filed: Jun. 29, 2020

(65) Prior Publication Data

US 2021/0243212 A1 Aug. 5, 2021

Related U.S. Application Data

(60) Provisional application No. 62/970,032, filed on Feb. 4, 2020.

(51) Int. Cl.
*H04L 9/40* (2022.01)
*G06N 5/04* (2023.01)
*G06N 20/00* (2019.01)

(52) U.S. Cl.
CPC ........... *H04L 63/1425* (2013.01); *G06N 5/04* (2013.01); *G06N 20/00* (2019.01); *H04L 63/0876* (2013.01)

(58) Field of Classification Search
CPC ... H04L 63/1425; H04L 63/0876; G06N 5/04; G06N 20/00
See application file for complete search history.

(56) References Cited

U.S. PATENT DOCUMENTS 11,270,185 B1 * 3/2022 Ouyang .................. G06N 3/004
2017/0063886 A1 * 3/2017 Muddu .................... H04L 63/06
(Continued)

OTHER PUBLICATIONS

Lokman et al.; NPL "Optimised Structure of Convolutional Neural Networks for Controller Area Network Classification"; Jul. 2018; IEEE (Year: 2018).*

(Continued)

*Primary Examiner* — Jackie Zuniga Abad
(74) *Attorney, Agent, or Firm* — Blank Rome LLP (57) ABSTRACT

A system includes a log receiving module, an authentication graph module, a sampling module, an embedding module, a training module, a link prediction module, and an anomaly detection module. The log receiving module is configured to receive a first plurality of network-level authentication logs. The authentication graph module is configured to generate an authentication graph. The sampling module is configured to generate a plurality of sequences. The embedding module is configured to tune a plurality of node embeddings according to the plurality of sequences. The training module is configured to train a link predictor according to the plurality of node embeddings and ground-truth edge information from the authentication graph. The link prediction module is configured to apply the link predictor to performs a link prediction. The anomaly detection module is configured to perform anomaly detection according to the link prediction.

20 Claims, 6 Drawing Sheets

(56) References Cited

U.S. PATENT DOCUMENTS

2020/0250308 A1* 8/2020 Li ..................... G06F 21/554
2021/0243190 A1* 8/2021 Bargury ............... G06F 21/604

OTHER PUBLICATIONS

S. M. Milajerdi, et al., "Poirot: Aligning Attack Behavior with Kernel Audit Records for Cyber Threat Hunting", ACM SIGSAC Conference on Computer and Communications Security (CCS '19), Nov. 11-15, 2019, 17 pgs.
J. R. Johnson, et al., "A Graph Analytic Metric for Mitigating Advanced Persistent Threat", IEEE, 2013, 5 pgs.
A. Fawaz, et al., "Lateral Movement Detection Using Distributed Data Fusion", 2016 IEEE 35th Symposium on Reliable Distributed Systems, IEEE, 2016, 10 pgs.
Y. Mirsky, et al., "Kitsune: An Ensemble of Autoencoders for Online Network Intrusion Detection", May 27, 2018, 15 pgs.
S. M. Milajerdi, et al., "Holmes: Real-time APT Detection Through Correlation of Suspicious Information Flows", 2019, 16 pgs.
Md Nahid Hossain, et al., "Sleuth: Real-time Attack Scenario Reconstruction from COTS Audit Data", Proceedings of the 26th USENIX Security Symposium, Aug. 16-18, 2017, 19 pgs.
S. M. Milajerdi, et al., "Holmes: Real-time APT Detection Through Correlation of Suspicious Information Flows", 2019 IEEE Symposium on Security and Privacy, pp. 1137-1152.

* cited by examiner

METHOD AND SYSTEM FOR DETECTING LATERAL MOVEMENT IN ENTERPRISE COMPUTER NETWORKS

CROSS-REFERENCE TO RELATED APPLICATIONS

This application claims the benefit of priority of U.S. Application Ser. No. 62/970,032 filed on Feb. 4, 2020 and entitled "METHOD AND SYSTEM FOR DETECTING LATERAL MOVEMENT IN ENTERPRISE COMPUTER NETWORKS," the content of which is relied upon and incorporated herein by reference in its entirety.

SPONSORED RESEARCH

This invention was made in part with Government support under Contract No. N66001-18-C-4033 awarded by DARPA, and grants 1350766, 1618706 and 1717774 awarded by the National Science Foundation. The U.S. Government has certain rights in this invention.

FIELD

The disclosure relates generally to the field of artificial intelligence and more particularly to a method and a system for detecting lateral movement in enterprise computer networks.

BACKGROUND

According to the 2019 FireEye M-Trends report, the median time to detection of a network intrusion was 78 days. While this is an impressive improvement from the 418 days reported in 2011, this still means an adversary would have over 2 months inside an environment to accomplish their mission prior to detection. Additionally, nearly half of all compromises are detected via external sources, indicating that the tools currently employed by enterprise-level cyber defenders are insufficient for detecting the highly sophisticated modern-day adversaries.

Existing systems and techniques for detecting network intrusions rely heavily on signatures of known-bad events, such as file hashes of malware, or byte streams of malicious network traffic. While these techniques are able to detect relatively unskilled adversaries who use known malware and common exploitation frameworks, they provide almost no utility for detecting advanced adversaries, coined Advanced Persistent Threats (APTs), who will use zero-day exploits, novel malware, and stealthy procedures.

Similarly, the state-of-the-art behavioral analytics in use today by network defenders utilize relatively rudimentary statistical features such as the number of bytes sent over a specific port, number of packets, ratio of TCP flags, etc. Not only are these types of analytics relatively noisy in terms of false positives, but they are also challenging to investigate due to their limited information and scope. For example, the fact that a particular host sent 50% more network packets in a given day could be indicative of many different events, ranging from data exfiltration, botnet command & control, to a myriad of other possibilities, most of which would not indicate a compromise, such as streaming a video.

No admission is made that any reference cited herein constitutes prior art. Applicant expressly reserves the right to challenge the accuracy and pertinence of any cited documents.

SUMMARY

To address these challenges, our approach is to build an abstract, behavior-based, graph data model, with key elements related to the particular behavior of interest we are trying to detect. Specifically, we model a computer network using a graph of authenticating entities, and the target behavior we detect is anomalous authentication between entities indicative of lateral movement within the network. Lateral movement is a key stage of APT campaigns when an attacker will authenticate to new resources and traverse through the network in order to gain access to systems and credentials necessary to carry out their mission. This is very challenging to detect as attackers will often use legitimate authentication channels with valid credentials as opposed to noisy exploitation procedures.

In order to effectively detect lateral movement, we first convert our input data, which is the in form of industry standard authentication logs, into a representation which will allow for not only learning about individual authentication events, but also the authentication behavior of the network as a whole. To that end, we construct an authentication graph, where nodes represent authenticating entities which can be machines, users, and/or software, and edges represent authentication events. Next, we utilize an unsupervised node embedding technique where latent representations are generated for each vertex in the graph. Finally, we train a link predictor algorithm on these vertex embeddings, and utilize this link predictor to identify low-probability links in new authentication events.

We apply our technique on two distinct datasets representing two contrasting computer networks. The PicoDomain dataset is a small simulated environment we developed in-house with only a few hosts, and spanning only 3 days. The second dataset is from Los Alamos National Labs (LANL) and is a real-world network capture from their internal enterprise computer network spanning 58 days with over 12,000 users and 17,000 computers. In both cases, there is labeled malicious authentication events associated with APT-style activity which were used as ground truth for evaluation purposes. We were able to detect the malicious authentication events in the real-world dataset with a true positive rate of 85% and a false positive rate of only 0.9%. In comparison, traditional heuristics, and non-graph based machine learning methods, were able to achieve at best 72% true positive rate and 4.4% false positive rate. Understanding that modern day cyber defenders are frequently receiving far too many false positives, we spent additional time building simple filters that allowed us to further reduce our false-positive rate by nearly 40% on the LANL dataset, while reducing true positives by less than 1%.

In summary, our contributions of this work include the followings. A graph data structure for modeling authentication behavior within enterprise-level computer networks based on information available in industry standard log files. An unsupervised graph-learning technique for identifying anomalous authentication events which are highly indicative of malicious lateral movement. Experiments on two datasets showing the strength of graph learning for this application domain.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

The remaining of this disclosure will be laid out as follows. Some information about authentication protocols, the graph structure, and define the problem of lateral movement is provided. Further, our proposed method is discussed, and the learning algorithm is explained. Our experimental evaluation and results are discussed. The related work is discussed. Further, potential embodiments are discussed, and conclusion is made.

1. AUTHENTICATION, GRAPH STRUCTURE, AND LATERAL MOVEMENT 1.1 Authentication

Modern enterprise computer networks rely on the ability to manage the permissions and privileges of users in order to maintain a safe and secure network. Users in the enterprise network will be given explicit permissions to access resources within the environment ranging from folders and network share drives, to applications and services. To make this possible, there have been many network authentication protocols developed through the years, which allow users to authenticate to resources in the network in order to verify that they have the privileges necessary to perform a certain action.

Common authentication protocols in today's enterprise computer networks include protocols such as Kerberos, NTLM, SAML, and others. Each one is designed to be a secure way to authenticate users inside an environment, and each has the ability to be abused. APT-level adversaries are well-versed in the workings of these authentication protocols, and they are often abused during an attack campaign. For example, the well-known "Pass the Hash" attack is a weakness in the NTLM implementation where the hash of a user's password, which can often be harvested from system memory, is used to authenticate to additional resources by the attacker.

Because hackers often abuse existing authentication channels, logs related to these critical protocols are valuable to the security analyst and detection algorithms. Typically these logs capture key information such as the account that is requesting to authenticate, the origin of the request, what they are attempting to authenticate to, as well as the result of that authentication request. Additionally, as authentication in the environment is network activity, we have the ability to capture this critical information from centralized network taps, rather than requiring expensive host-based log collection.

1.2 Graph Structure

At 311 (FIG. 3), there were two main considerations in how we chose to build our graph data structure. First, we wanted the input data to be highly accessible to our network defenders. This means utilizing data that is likely already being collected at the enterprise scale. While some smaller enterprises may have the luxury of collecting verbose system logs from all endpoints, larger enterprises are limited to coarse feeds from centralized resources such as network sensors or domain controllers. Second, we wanted the data to provide clear and concise information related to our target detection of lateral movement. Therefore, we design our algorithm to utilize network-level authentication logs generated from Zeek sensors (formerly Bro). Specifically, we utilize the Kerberos logging capability, which generates protocol specific logging on the Kerberos authentication protocol which is utilized in the majority of Microsoft Windows domains. The technique is easily adaptable, however, to other authentication logs such as host-based authentication logs, NTLM logs, Active Directory logs, or others, providing they can uniquely identify authentication events between user and system identities in the network.

For Kerberos logs, we extract the client and service principals, which are unique identifiers associated with users and services in the network, as well as the source Internet-Protocol (IP) address of the requesting entity, which will uniquely identify the machine from which the client is operating. The destination IP address will always be the IP of the Kerberos server itself, and thus does not add valuable information to our graph. Here is an example of content we extract from the Kerberos logs with their respective Zeek column headings:

| client    | id_orig_h  | service       |
|-----------|------------|---------------|
| jdoe/G.LAB | 10.1.1.152 | host/hr-1.g.lab |

This record shows that the user jdoe of domain G.LAB authenticated to service host/hr-1.g.lab, which is a host in the network, from IP address 10.1.1.152.

The Zeek log that this example was created from is part of a collection of Zeek logs generated between Jul. 19, 2019 to Jul. 21, 2019. The Zeek sensor was configured to log in UTC and save logs as JSON as is the current industry standard.

Below is an example of a Zeek Kerberos log JSON object that would generate the above example.
{"ts": "2019-07-20T12:22:07.237641Z",
"uid": "CIKD7Hvs7PfUsMBHh",
"id.orig_h": "10.99.99.152",
"id.orig_p": 52081,
"id.resp_h": "10.99.99.5", "id.resp_p": 88,
"request_type": "AS",
"client": "jdoe/G",
"service": "krbtgt/G.LAB",
"success": true,
"till": "2037-09-13T02:48:05.000000Z",
"cipher": "aes256-cts-hmac-sha1-96",
"forwardable": true,
"renewable": true}

Definition 1: An authentication graph (AG), 312 (FIG. 3), is defined as a graph G=(V,E) with a node type mapping φ: V→A and an edge type mapping Ψ: E→R, where V denotes the node set and E denotes the edge set, A={IP, user, service} and R={authentication}. For example, referring to 312 (FIG. 3), nodes in a node set (e.g., circles denoted by 1, 2, 3, 4, 5, and 6) may represent IP, user, and/or service; and edges in an edge set (e.g., lines between the circles denoted by 1, 2, 3, 4, 5, and 6) may represent authentication events.

Figure 1:
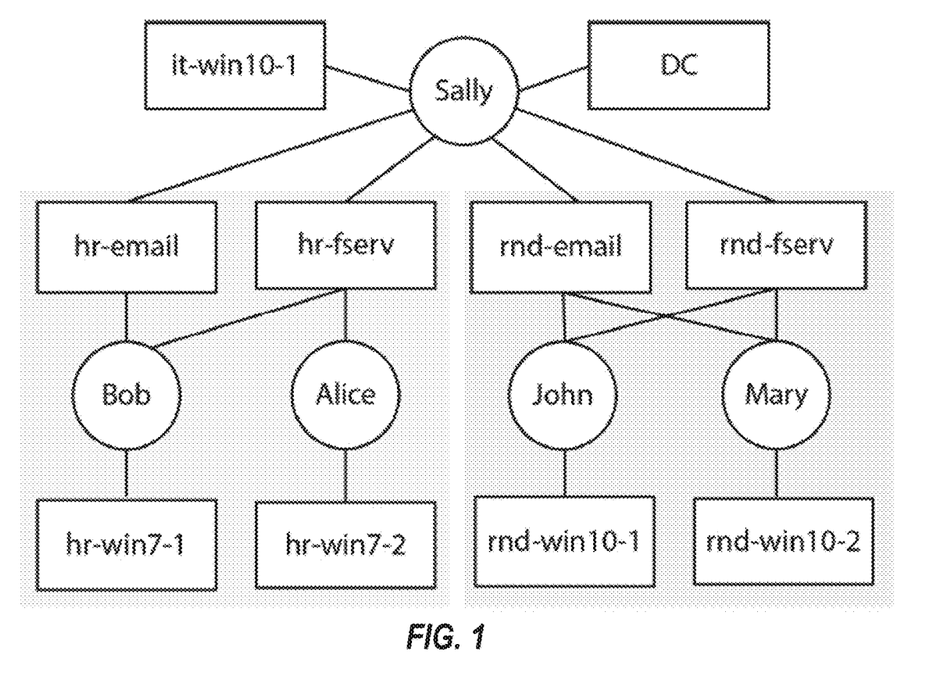
FIG. 1 is an example of an authentication graph for a small simulated network.

A simple authentication graph generated from a small simulated computer network is shown in FIG. 1. We can infer from this graph that there are two separate organizational units in our enterprise: the hr unit and the rnd unit, each with two user nodes (Bob and Alice, John and Mary) interacting with user workstations represented as service nodes (hr-win7-1, hr-win7-2, md-win10-1, rnd-win10-2), as well as some email servers and file servers (hr-email, hr-fserv, md-email, rnd-fserv). We can see that user Sally is a network administrator, as she has authentication activity to the Domain Controller service node (DC) in the environment, the email and file server nodes, as well as her own workstation node (it-win10-1). Note that for display purposes, the IP nodes have been collapsed into their representative service nodes.

1.3 Lateral Movement

Figure 2:
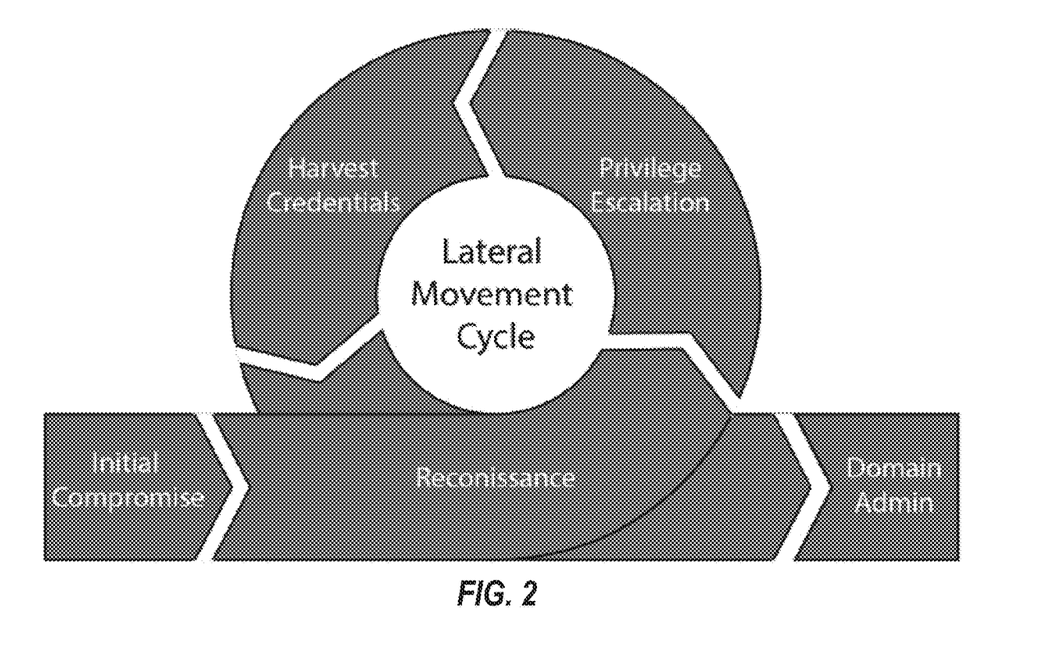
FIG. 2 is an advanced persistent threats (APT)-style campaign showing the cycle of lateral movement after initial compromise and prior to full domain ownership.

Lateral movement is a key stage of APT-level attack campaigns as seen in various attack taxonomies such as the Lockheed Martin Cyber Kill Chain, and the MITRE ATT@CK framework. FIG. 2 provides a simplified version of an APT-style campaign. After some initial compromise, and prior to domain ownership by the adversary, there is a cycle of lateral movement through the network. In most cases, the system that is initially compromised will be a low privileged account, typically a user workstation. This is due to the prevalence of client-side attacks (e.g., phishing), which are much more effective on typical, low-privilege users, as opposed to high privilege IT professionals. Thus, the attacker almost always gains a foothold on a low privilege system and is thus required to move laterally through the network to achieve their goals.

Definition 2: Lateral movement is defined as a malicious path <u,v> conducted by an attacker in an organization's network characterized by the authentication graph, where u,v belong to entity set {IP, user, service}.

For example, in FIG. 1, if the user Alice fell victim to a phishing email and downloaded malware, the attacker would gain their initial foothold as account Alice on hr-win7-2. As Alice is a low-privilege account, it is unlikely that the attacker would be able to do much harm to the enterprise at large, such as installing ransomware on all the systems in the network, or exfiltrating highly sensitive business data. Therefore, the attacker would be required to move laterally to systems and accounts that have higher permissions in the environment. This can be done by exploitation of vulnerabilities, however, this is often a noisy and error prone process. More often, adversaries will harvest and abuse legitimate credentials from the set of compromised systems. In the case of our example, Alice could harvest the domain admin Sally's credentials from the file server hr-fserv which Sally had previously authenticated to, and Alice has privileges to access. Now, with Sally's credentials, Alice can authenticate from hr-win7-2 to the Domain Controller (DC). This attack could be characterized by the lateral movement path: <hr-win7-2, Sally, DC>.

Existing techniques are not well suited to detect lateral movement within enterprise-scale environments. Most Intrusion Detection Systems (IDSs) are placed at the border of a network, and will fail to detect attacker actions after an initial foothold has been established. Even if the IDS had total visibility, an attacker using legitimate authentication channels would likely not trigger any alerts. Host-based security software relies almost exclusively on identifying signatures of known malware, and thus will prove ineffective at detecting APT-level adversaries who will move laterally through a network using novel malware or legitimate authentication mechanisms. Some environments may implement a Security Information Events Management (SIEM) System, which would allow for more complex log analytics. However, SIEMs are typically standard row or columnar data stores such as Splunk which only allow for relatively basic statistical analysis of the data. Behavioral analytics implemented in SIEMs are typically simple aggregate trends of low level features such as bytes over particular ports and protocols.

2. METHOD AND SYSTEM

In this section we will discuss our method and system for detecting lateral movement in enterprise computer networks. We provide an overview of our machine learning pipeline, followed by detailed discussions of the node embedding process (314 in FIG. 3), the link predictor training (315 in FIG. 3), and the anomaly detection (324 in FIG. 3).

2.1 Overview

Figure 3:
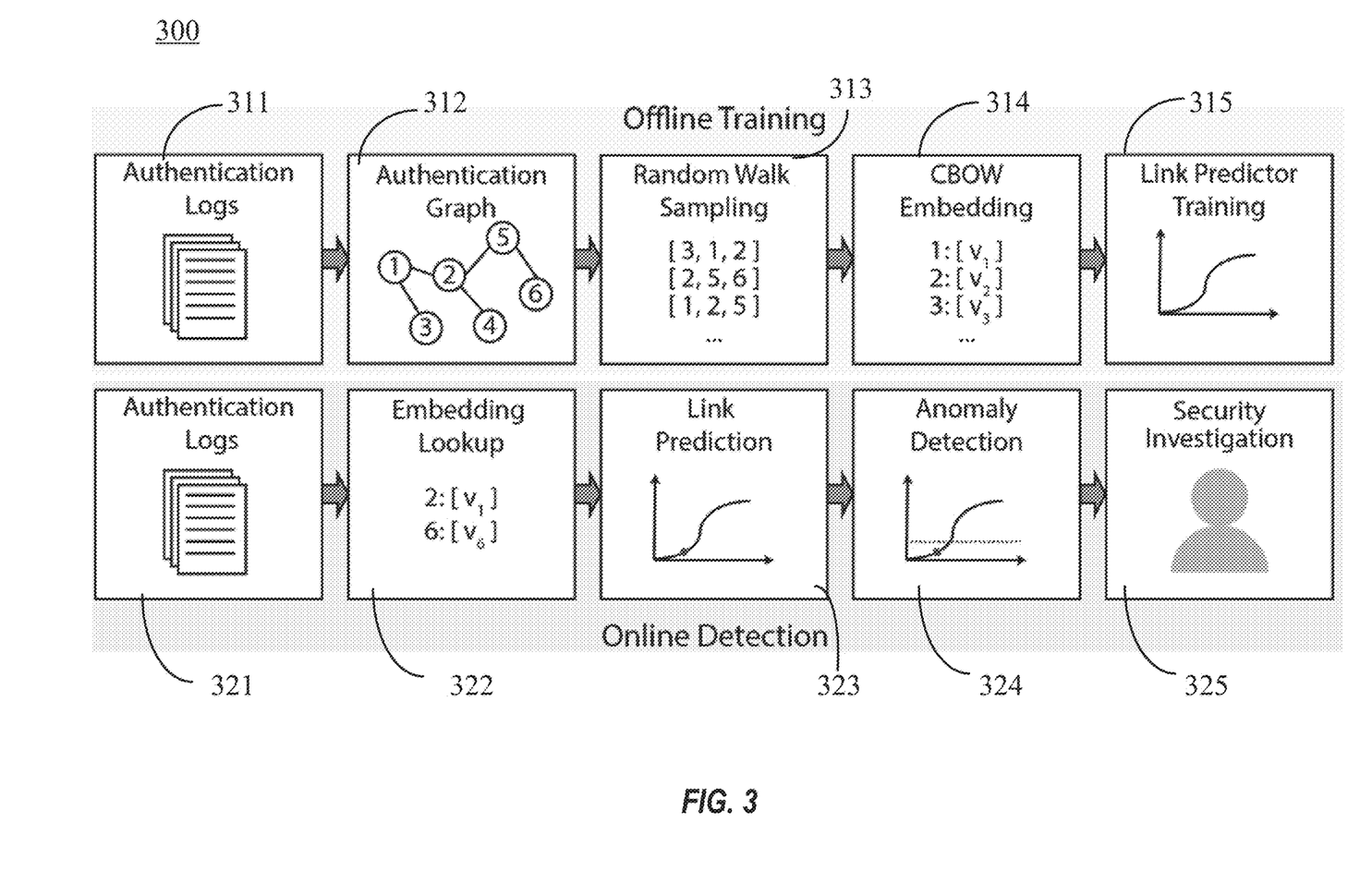
FIG. 3 illustrates full algorithm pipeline including offline training of node embeddings and Logistic Regression Link predictor, as well as online detection via an embedding lookup, link prediction, and threshold-based anomaly detection.

In order to detect lateral movement in enterprise computer networks, we generate authentication graphs as discussed previously and apply an unsupervised graph learning process to identify low probability links. FIG. 3 shows the algorithm pipeline 300. During the offline training stage (the top half of the figure), we start by generating authentication graphs (312), then create node embeddings via a random walk sampling and embedding process (313 and 314), and finally train a logistic regression link predictor using the node embeddings and ground-truth edge information from the authentication graph (315).

During the online detection stage (the bottom half of the figure), new authentication events are processed resulting in new edges between authenticating entities (321). Embeddings for these entities are generated via an embedding lookup (322), and link prediction is performed using the trained logistic regression link predictor (323). Anomaly detection is performed via a (configurable) threshold value (324), where links below a particular probability threshold will be forwarded to security experts for investigation (325).

2.2 Node Embedding Generation

Node embedding generation is the process by which a d-dimensional vector is learned for each node in a graph. The goal of these approaches is to generate a vector representation for each node which captures some degree of behavior within the network as a whole.

For the authentication graph, we use H to denote the set of node embeddings, $H=\{h_1, h_2, \ldots, h_n\}$, where $h_i$ denotes the node embedding for the ith node, and n denotes the number of nodes in the graph. In the beginning, nodes do not have embeddings, which means $h_i=\emptyset$.

At 313, in order to extract latent node representations from the graph, we utilize an unsupervised node embedding technique similar to DeepWalk, and node2vec. We first sample our authentication graph via unbiased, fixed-length random walks. Specifically, for any node v in the graph, we will explore r random walks with a fixed-length l. For a random walk starting from node v, let $v_i$ denote the ith node in the walk, the node sequence for this walk is generated with the following probability distribution:

$$P(v_i = x \mid v_{i-1} = y) = \begin{cases} \frac{1}{d_y}, & \text{if } (x, y) \in E \\ 0, & \text{otherwise} \end{cases} \quad (1)$$

where E denotes the edge set in the graph, and $d_y$ is the degree of node y. This results in a set of random walk sequences $S=\{S_1, S_2, \ldots, S_m\}$, where $S_i$ denotes the ith random walk sequence, and m denotes the total number of sequences.

With the sequence set of the random walks, we then, at 314, tune node embeddings via a Continuous-Bag-of-Words (CBOW) model with negative sampling. In the CBOW model, we predict the target node provided context nodes from the random walk sequence. We utilize negative sampling such that we only update the vectors of a subset of nodes that were not found in the particular context window of the target node.

At 315, we use the Noise Contrastive Estimation (NCE) loss as defined in Equation 2, which differentiates the target sample from noise samples using logistic regression.

$$L = -\left[\log p(y = 1 \mid h_T, h_I) + \sum_{h_U \in N(h_I)} \log p(y = 0 \mid h_U, h_I)\right] \quad (2)$$

where y denotes the label, $h_T$ denotes the embedding of the target node, $h_I$ denotes the embedding of the input node which is the average of the context nodes, $h_U$ denotes the embedding of a noise node, and N(•) denotes the set of noise node embeddings for that input.

Further, the probability for different labels of negative sampling is defined in Equation 3, $$p(y=1 \mid h_T, h_I) = \sigma(h'^T_T h_I)$$

$$p(y=0 \mid h_T, h_I) = \sigma(-h'^T_T h_I) \quad (3)$$

where σ(•) denotes the sigmoid function, $h'_T$ denotes the column vector for $h_T$. Therefore, the final loss value is calculated by Equation 4.

$$L = -\left[\log \sigma(h'^T_T h_I) + \sum_{h_U \in N(h_I)} \log \sigma(-h'^T_T h_I)\right] \quad (4)$$

By minimizing the loss value from Equation 4, we are able to tune our node embeddings such that we are more likely to predict our target node embedding $h_T$ given the context node embeddings $h_I$, while simultaneously less likely to predict the negative sample node embeddings $h_U$ given the same context $h_I$. We use Stochastic Gradient Descent (SGD) to minimize the loss function. In the end, we generate the output node embedding set $H'=\{h'_1, h'_2, \ldots, h'_n\}$, where $h'_i$ is the d-dimension embedding for node i.

In the context of the authentication graph, this process equates to predicting a user based on the machines and users found within at-most l-hops away. This will result in node embeddings where users who often authenticate to similar entities will be embedded in a similar region. Similarly, systems which share a user base will be found embedded in a similar region. This provides us the ability to then look at authentication events as events between two abstract vectors, as opposed to between distinct users and machines.

Figure 4:
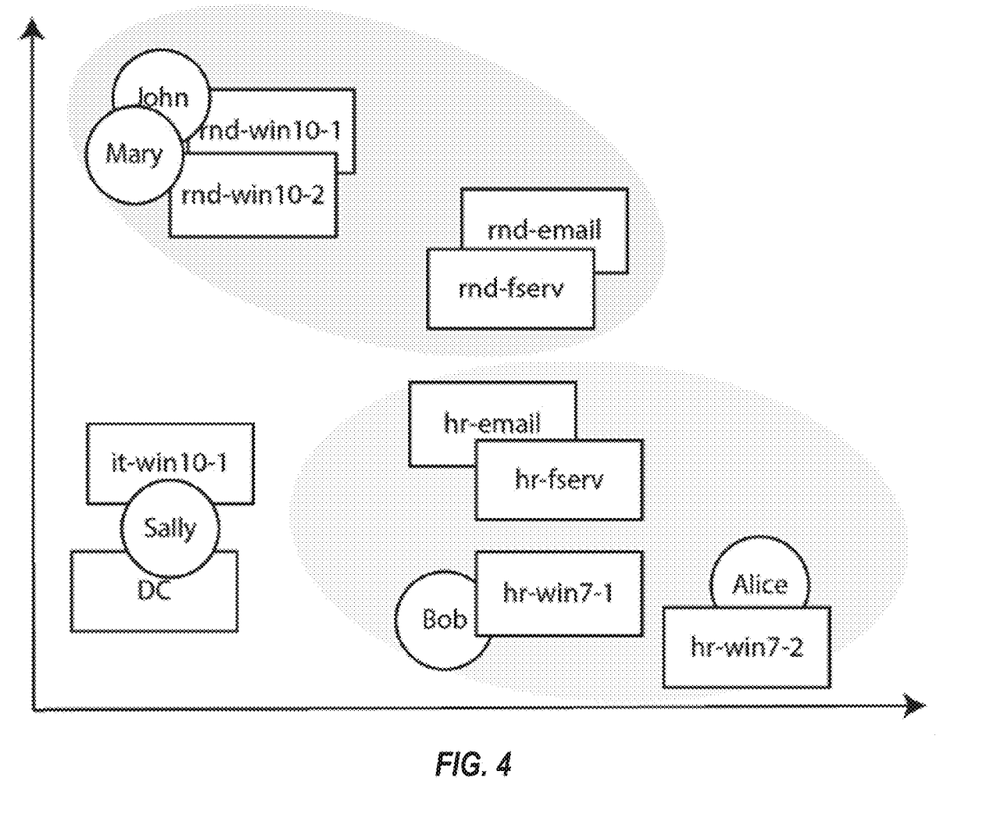
FIG. 4 is an example embedding space generated from a random-walk based node-embedding process.

FIG. 4 provides a 2-dimensional embedding space generated for the graph in FIG. 1 using this node embedding process. We can see that the embedding of the graph corresponds nicely to the organizational units of the various users and systems. Additionally we see that the servers are clearly separated from the users and their workstations. Also, the network administrator is clearly separated from both organizational units. In addition, notice that the user Alice does not have an edge to the hr-email server in the authentication graph, despite clearly being a member of the hr organization. Even though this is the case, we can see that Alice is co-located in the embedding space with other $h_r$ users and systems. This fact will be crucial during the link prediction process, as even though there is no explicit link between Alice and the hr-email server, we would like our link prediction algorithm to predict a high probability for the authentication event between Alice and hr-email, considering it is perfectly reasonable that Alice authenticates to the $h_r$-email server.

2.3 Link Prediction

Next, at 323 (FIG. 3), we utilize a traditional Logistic Regression (LR) algorithm to provide us with a probability estimate that a particular authentication event occurs between two nodes a and b. Formally, our LR algorithm models:

$$P(y = 1 \mid h') = \sigma(h') = \frac{1}{1 + e^{-w^T h'}} \quad (5)$$

where y is the binary label indicating if an edge exists or not, the weight vector w contains the learned parameters, and h' is the element-wise multiplication of the node embeddings $h_a$ and $h_b$ defined in Equation 6, also known as the Hadamard product.

$$h_a \circ h_b = (h_a)_{ij} \cdot (h_b)_{ij} \quad (6)$$

We train the above model by generating a dataset of true and false edge embeddings from the ground truth authentication graph. The true edge set consists of all edges in the authentication graph:

$$E_T = h_a \circ h_b \forall (a,b) \in E \quad (7)$$

with each edge embedding receiving a binary label of 1. On the contrary, the false edge set consists of all edges that do not exist in the authentication graph:

$$E_F = h_a \circ h_b \forall (a,b) \notin E \quad (8)$$

with each edge embedding receiving a binary label of 0. Training on these two sets of data would cause significant over fitting as $E_F$ contains every possible edge not in the original edge set E. Therefore, we down sample $E_F$ via a random sampling process, and only train on the same number of false edges as found in $E_T$.

2.4 Anomaly Detection

Anomaly detection 324 (FIG. 3) is achieved by applying our trained LR link predictor to new authentication events. First, authentication events are parsed into a set of edges between authenticating entities. Next, we perform an embedding lookup for the node embeddings generated during the training stage. The anomaly detection function A can be expressed as:

$$A(h_a, h_b) = \begin{cases} 1, & \text{if } f(h_a \circ h_b) < \delta \\ 0, & \text{otherwise} \end{cases} \quad (9)$$

where $h_a$ and $h_b$ are the embeddings for nodes a and b, and the function $f(\bullet)$ is the logistic regression link predictor trained on the true and false edges generated from our training graph. The parameter $\delta$ is the threshold for a generating alert. In this paper, we use a threshold of $\delta=0.1$, or 10%, which we will show shortly yields good performance.

3. EVALUATION

In this section we will evaluate our technique for detecting malicious authentication in enterprise networks. First we will discuss the datasets we used for evaluation, followed by a detailed description of the various methods we evaluated, and an analysis of our results. In an effort to further reduce false positives, we make some observations about the data and our results, and update our algorithm accordingly.

3.1 Datasets

We apply our malicious authentication detection to two datasets generated from contrasting computer networks. Table 1 provides details on each dataset. We discuss both datasets in detail below.

TABLE 1

Dataset Details

|  | PicoDomain | LANL |
|---|---|---|
| Duration in Days | 3 | 58 |
| Days with Attacks | 2 | 18 |
| Total Records | 4686 | 1.05 B |
| Total Attack Records | 129 | 749 |
| User and Machine Accounts | 86 | 99968 |
| Computers | 6 | 17666 |

PicoDomain is a dataset we generated in-house for cyber security research. It is designed to be a highly scaled-down environment which contains only the most critical elements commonly found in enterprise-level domains. Specifically, the PicoDomain consists of a small Windows-based environment with five workstations, a domain controller, a gateway firewall/router, and a small-scale internet that houses several websites as well as the adversarial infrastructure. A Zeek network sensor was installed inside the environment and placed such that it had visibility of traffic entering and leaving the network from the simulated Internet (north/south), as well as traffic between local systems in the simulated enterprise network (east/west). A total of three days of network traffic was captured. During this three-day period, there was benign activity performed in a typical 9-5 workday pattern, such as browsing the web, checking e-mail, etc. Additionally, on days 2 and 3, we ran an APT-style attack campaign which included all stages of the killchain. The attack campaign started with a malicious file downloaded from an e-mail attachment. This gave the attacker the initial foothold in the network. The attacker then was able to move laterally through the network and ultimately compromise a domain admin account, resulting in full network ownership by the attacker.

Comprehensive Cyber Security Events is a dataset released by Los Alamos National Labs (LANL) and consists of 58 consecutive days of anonymized network and host data. There are over 1 billion events containing authentication activity for over 12,000 users and 17,000 computers in the network. An APT-style attack was performed during the data capture, and relevant authentication log entries were labeled as being malicious or benign. No further details were provided in the dataset as to what types of attacks were performed during the exercise. This is a limiting factor of this dataset, and, in fact, led to the generation of the previously mentioned PicoDomain dataset.

3.2 Methods Evaluated

We evaluate two variants of our proposed graph learning methods, as well as four different baseline techniques, which include two non-graph-based machine learning algorithms, as well as two traditional rule-based heuristics. We will discuss each below.

Graph Learning with Local View (GL-LV). This is our graph learning technique configured in such a way as to have a more localized view in our graph. This means our embeddings and link predictor will be optimized for nodes within a close proximity. To achieve this, we generate 20 random walks of length 10 for every node, and generate a 128-dimension embedding for each node based on a context window size of 2. This means each node will only consider a neighborhood of 2-hop neighbors in the embedding process. Our anomaly detection threshold is set at $\delta=0.1$.

Graph Learning with Global View (GL-GV). This is our second graph learning variant which is very similar to the first, however this time configured to have a more global view of the graph. This means our embeddings and link predictor will be optimized for nodes that are further apart in our graph. To that end we used the same configuration as previously, however now setting the window size to 5. This means nodes will consider at most 5-hop neighbors during the embedding and link prediction process, which will give the algorithm a much broader view of the graph.

Local Outlier Factor (LOF). For a non-graph-based machine learning comparison, we implement the LOF anomaly detection algorithm. The LOF is a density based anomaly detection approach, where relative local densities are compared between each sample, and those which are very different from their neighbors are considered anomalous. In order to generate features for this algorithm, we 1-hot encode the authentication events into an authentication vector containing a dimension for all authenticating entities. For each event, the dimensions corresponding to the various authenticating entities for that particular record will be set to 1, and all other dimensions will be 0. We then apply the LOF algorithm to these vectors to identify anomalies.

Isolation Forest (IF). This is a second non-graph-based machine learning comparison technique. The Isolation Forest algorithm identifies samples that can be easily isolated from the dataset by simple decision trees as being anomalous. This is applied to the same authentication vectors as in the previous LOF method.

Unknown Authentication (UA). This is a more traditional rule-based heuristic which simply identifies all first-time authentication events as anomalous. During the training period, a list of known authentications is generated for each authenticating entity in the network. During the testing phase, any authentication event which was not seen during the training phase is considered as anomalous. After an anomalous result is generated the first time, the authentication event is added to the set of known authentications for the particular entity. This way we do not generate repeated anomalies for the same event.

Failed Login (FL). This is a second traditional rule-based heuristic which considers all failed login events as anomalous. As this technique does not requiring any training data, we only evaluate it on the test portion of the datasets.

3.3 Detection Analysis

Next we apply the six different algorithms discussed previously and evaluate their ability to detect malicious authentication in our two datasets. For all techniques, we report the number of true positives (TP), false positives (FP), as well as the true positive rate (TPR), and false positive rate (FPR).

PicoDomain. First we apply all techniques to the simulated PicoDomain dataset. We split the dataset into training and testing, with the training data consisting of authentication activity before the APT attack began, and the testing data containing all other activity. As this is a small dataset focused on malicious activity, the majority of the time period encapsulates red team activity. As a result, there was only roughly 20% clean training data available. Thus our final train/test split on this data was about 20%/80%. For all 6 detection techniques, we only generate accuracy metrics on the testing dataset.

Table 2 shows the results for all six techniques. Not unsurprisingly, the UA detector performed very well, with 100% TPR, and only 1.5% FPR. This means all of the lateral movement associated with the APT campaign involved systems which did not have authentication activity during the training period, a characteristic that is likely only to hold in relatively small and simulated environments. We can also see that the failed login (FL) rule generated very few results, and only managed to detect a single event associated with the malicious activity. This is due to the fact that the APT campaign did not involve any brute-force password guessing attempts. The single failed login is likely due to user error during the attack.

TABLE 2

Anomaly Detection Results on PicoDomain Dataset

| Algorithm | TP | FP | TPR (%) | FPR (%) |
|---|---|---|---|---|
| UA | 129 | 11 | 100 | 1.5 |
| FL | 1 | 15 | 0.8 | 2.0 |
| LOF | 41 | 19 | 32 | 2.5 |
| IF | 34 | 62 | 26 | 8.3 |
| GL-LV | 102 | 0 | 80 | 0.0 |
| GL-GV | 102 | 0 | 80 | 0.0 |

Both ML techniques (LOF and IF) struggled to detect malicious events, with TPRs well below 50%, and FPRs as high as 8.3%. This indicates that the pure authentication activity between entities, without the additional information present in the graph topology, is not sufficient for detecting lateral movement.

Our graph learning techniques, GL-LV and GL-GV, performed much better than the comparison ML techniques, achieving 80% TPR. This shows the strength of the graph topology for the detection of lateral movement. Additionally, the graph-learning approaches were able to reduce the FPR to 0% compared with the 1.5% of the UA detector. A low false positive rate is critical for anomaly detection techniques, as will be made clear by the next experiment on the LANL dataset. Interestingly, we see that the global view and local view had no effect on the performance. This again is likely due to the extremely small scale of this dataset.

LANL. Here we apply the same 6 detectors to the LANL Comprehensive Cyber Security Events dataset. In a similar manner, we split the data into training and testing sets. The training set consists of 40 days on which no malicious activity is reported, and the testing set of 18 days with malicious activity. This is equivalent to roughly 70% training data, and 30% testing data. Due to the large scale of this dataset, it was necessary that we perform an additional down sampling for the two ML techniques LOF and IF, which was accomplished by removing timestamps from the training and testing dataset, and removing duplicate events. The TPR and FPR for these two techniques have been adjusted to account for this.

Table 3 shows the results for the six anomaly detectors. The impact of scale is readily evident in these results, with a significant amount of false positives for all detectors, despite reasonably small false-positive rates.

TABLE 3

Anomaly Detection Results on LANL Dataset

| Algorithm | TP | FP | TPR (%) | FPR (%) |
|---|---|---|---|---|
| UA | 542 | 530082 | 72 | 4.4 |
| FL | 31 | 116600 | 4 | 1.0 |
| LOF | 87 | 169460 | 12 | 9.6 |
| IF | 65 | 299737 | 9 | 16.9 |
| GL-LV | 503 | 146285 | 67 | 1.2 |
| GL-GV | 635 | 107960 | 85 | 0.9 |

We can see that the UA detector performs again reasonably well, with a significant 72% of the malicious authentication events detected. However, with this real-world dataset, we can see how noisy this detector is, with a FPR of 4.4% resulting in over 500,000 false positives. The FL detector again fails to perform, indicating that for APT style campaigns, simple failed login attempts are not suitable detectors. Similarly, both ML approaches generated many false positives, and few true positives, again showing that simple authentication events without the added information in the authentication graph are insufficient for malicious authentication detection.

The two graph learning techniques were able to provide the best TPR at the least FPR. The GL-LV detector, although returning less true positives than the simple UA detector, was still able to detect 67% of the malicious activity, at only 1.2% FPR compared to 4.4% by the UA detector. The best performing predictor on this dataset is the GL_GV detector, which was able to detect the most malicious authentication events with a TPR of 85%, while maintaining the lowest FPR of 0.9%. For this dataset, the increased context window of the GL-GV over the GL-LV contributed significantly to the added performance. This indicates that, on sufficiently large datasets, an increased authentication context window can provide improved node embeddings, resulting in a better performing link predictor.

3.4 Reducing False Positives

As we can see from the previous experiment, and specifically Table 3, the effect of false positives on the datasets of the scale found in the real-world can be very detrimental. Even for the best performing detector, the GL_GV detector, a false positive rate of 0.9% resulted in over 100,000 individual false positive results in the test data. As these results will ultimately be used by cyber analysts to investigate the threats, it is important that we do our best to keep the false positives to a minimum. In this section, we present some of our observations of the data and results, and design several filters to further reduce the false positive rate by nearly 40%, while reducing true positives by less than 1%.

Observation 1: The malicious authentication events are predominantly first authentication events.

This observation was made based on the fact that the simple unknown authentication (UA) detector performed very well at identifying the malicious events. However, its false positive rate was far too high to use on its own. Based on this observation, we use the inverse of this detector as a false positive filter. More precisely, all anomalies generated by the graph learning approach are passed through a filter based on the known authentication events. We discard any of the anomalous authentication events that were previously seen during the training period. This filter corresponds to the "Known Auth" filter in FIG. 5. We can see that we achieved about a 10% reduction in false positives, while only reducing true positives by less than 1%.

Observation 2: The malicious authentication events are predominantly based on user interactions.

Our authentication graph includes interactions between users and computers, but also interactions between purely computers. Some of the interactions are possibly associated with the red team exercise, however, the labeling scheme utilized by LANL only labeled authentication events involving user accounts as being malicious. Without further details on exactly what the red team activity entailed, it is impossible to label other interactions as malicious or benign that could have been associated with the red team exercise. Based on this, we modify our anomaly detection algorithm, and again add a new filter where the results that are generated and do not involve at least one user account are discarded. This filter corresponds to the "User Only" filter in FIG. 5. We can see this had a significant impact on the results, reducing false positives by over 20% from the original, while not reducing the true positives at all.

Observation 3: The malicious authentication events are predominantly related to specific user accounts and systems.

This observation makes sense from a practical standpoint. When an adversary gains access to a network, it is unlikely that they have multiple initial footholds. Typically a single foothold would be established, and then access throughout the network would expand from there. This means that all of the malicious events in our authentication graph should be close together, or even form a connected component in the graph. Based on this observation, we build a third filter, where all of the anomalous results are cross-referenced with the original anomaly graph, and only those results forming a connected component are saved. This filter corresponds to the "Anomaly Chain" filter in FIG. 5. This resulted again in about 20% reduction in false positives from the original, and no reduction in true positives.

Figure 5:
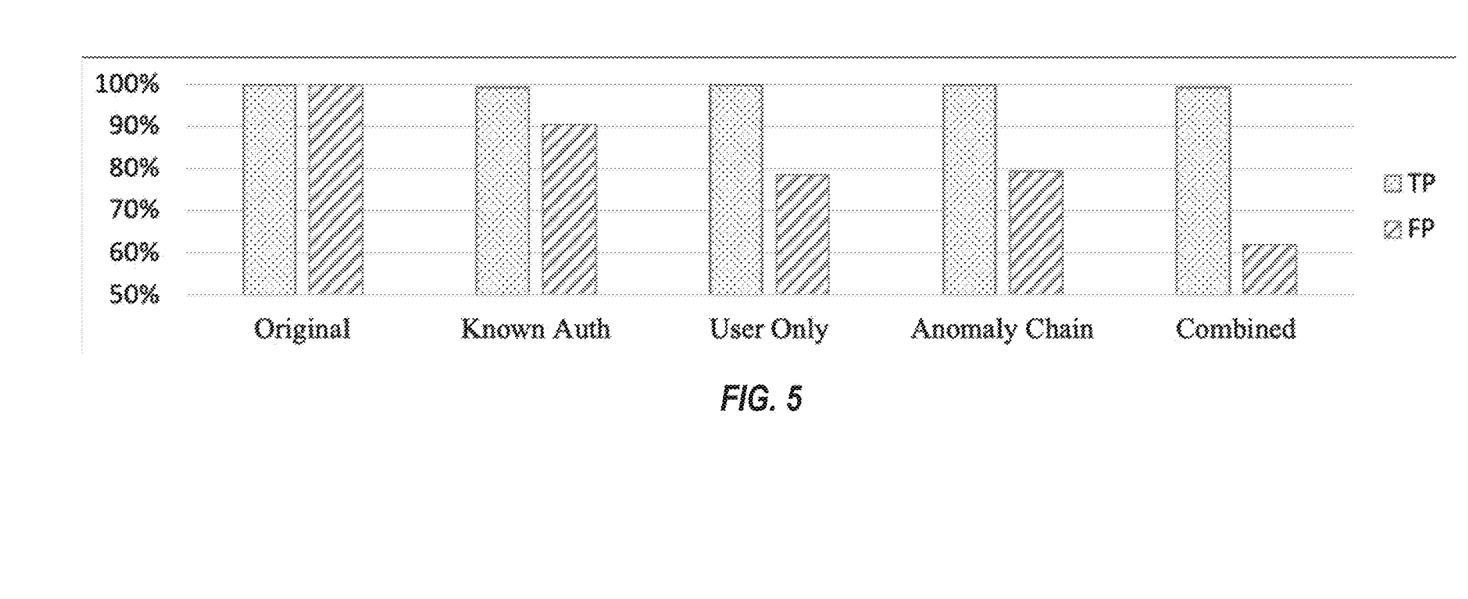
FIG. 5 illustrates impact of various approaches in reducing the number of false positives returned on the LANL dataset.

To summarize, the last bars, "Combined", in FIG. 5 represent combining all of the previous filters together. We can see this resulted in the best performance, and was able to reduce the number of FPs on the LANL dataset by nearly 40%, while losing <1% of the true positives.

Figure 6:
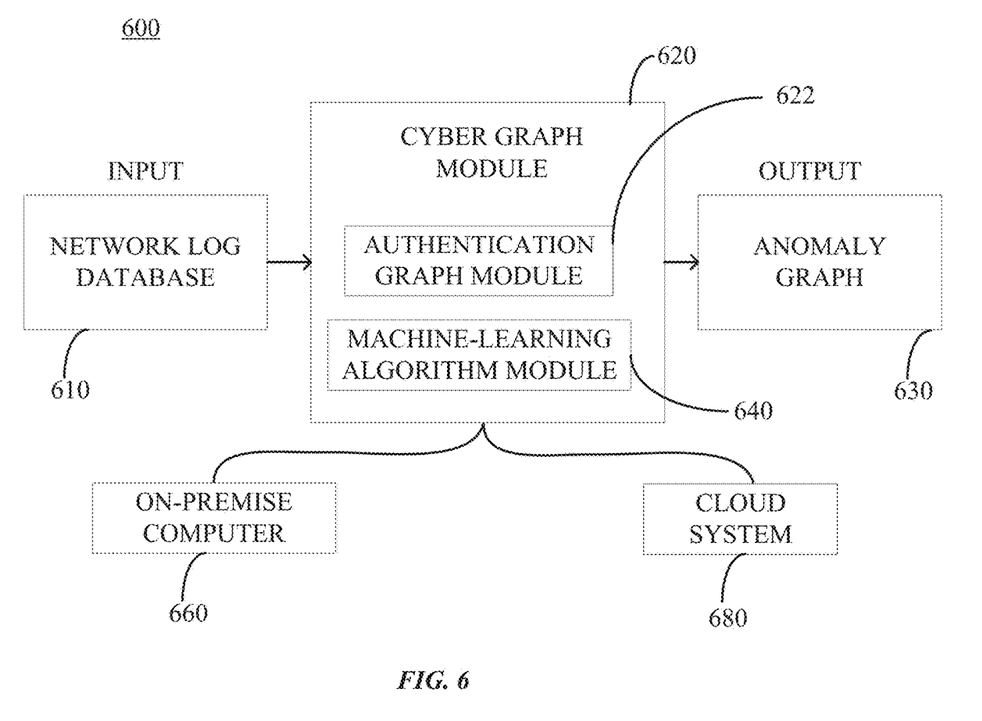
FIG. 6 illustrates a block diagram of an exemplary system for detecting lateral movement according to one example.
Figure 8:
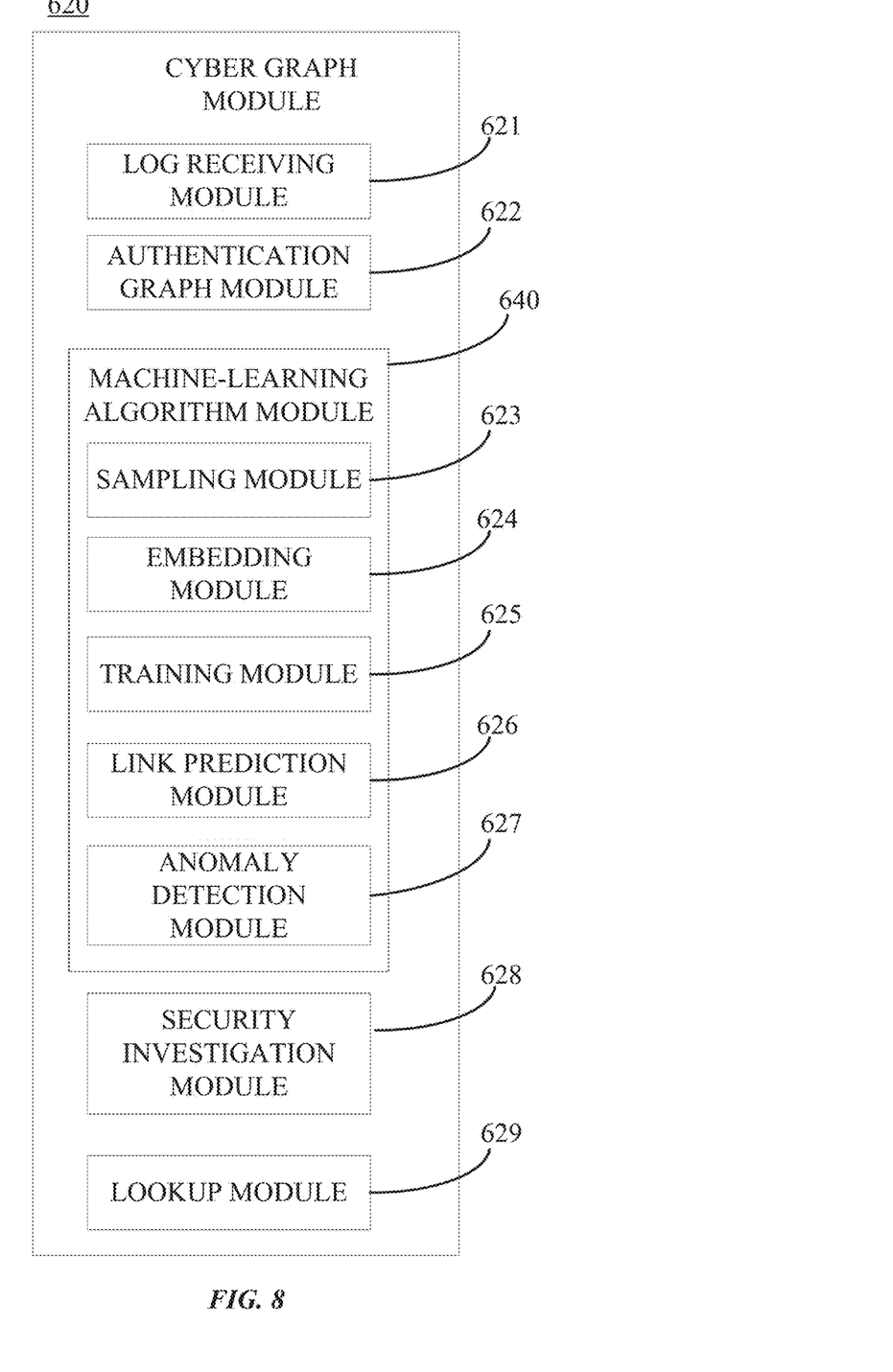
FIG. 8 illustrates a block diagram of an exemplary cyber graph module according to one example.

FIG. 6 illustrates a schematic diagram of a detecting system 600. The detecting system 600 has a network log database 610 as an input, a cyber graph module 620, an anomaly graph 630 as an output, an on-premise computer 660, and a cloud system 680. The cyber graph module 620 includes an authentication graph module 622 and a machine-learning algorithm module 640. Referring to FIG. 8, the cyber graph module 620 may further include a log receiving module 621, a security investigation module 628, and a lookup module 629; and the machine learning algorithm module 640 may include a sampling module 623, an embedding module 624, a training module 625, a link prediction module 626, and an anomaly detection module 627. The detecting system 600 detects lateral movement according to one example.

Referring to FIG. 6, in some embodiments, the network log database 610 may store input data. The input data may include network-level authentication logs. The cyber graph module 620 may receive network-level and industry standard authentication logs from the network log database 610. The authentication graph module 622 may convert the received authentication logs to construct an authentication graph. Based on the authentication graph, the machine-learning algorithm module 640 may perform machine-learning processes to train a link predictor. According to the trained link predictor, the cyber graph module 620 may generate an anomaly graph 630 as an output. The on-premise computer 660 and/or the cloud system 680 may include the cyber graph module 620, and may perform the various processes consistent with the present disclosure, for example, the above-described processes/methods associated with the cyber graph module 620.

Figure 7:
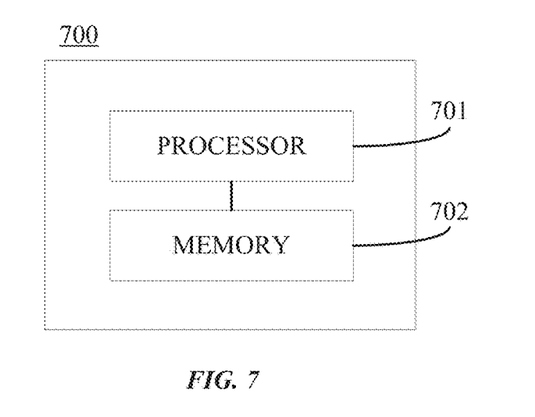
FIG. 7 illustrates a schematic view of an exemplary processing device according to various embodiments.

The on-premise computer 660 and/or the cloud system 680 may include a processing device 700 (FIG. 7). In some embodiments, the cyber graph module 620 of the detecting system 600 may perform various detecting methods consistent with the present disclosure via the processing device 700.

According to one example, the detecting system 600 may detect lateral movement as follows. Referring to FIGS. 3, 6, and 8, at 311, the log receiving module 621 receives network-level authentication logs from the network log database 610 in the offline training stage.

The authentication logs may include, for example, the client and service principals, which are unique identifiers associated with users and services in the network, as well as the source Internet-Protocol (IP) address of the requesting entity, which will uniquely identify the machine from which the client is operating.

At 312, the authentication graph module 622 converts the received network-level authentication logs to generate an authentication graph. The authentication graph module 622 may convert the network-level and industry-standard authentication logs, into a representation which allows for not only learning about individual authentication events, but also the authentication behavior of the network as a whole. The authentication graph module 622 may generate an authentication graph by using information extracted from the network-level authentication logs, e.g., the client and service principals, and/or the source IP address of the requesting entity. The authentication graph may include nodes representing authenticating entities which can include machines, users, and/or software, and edges representing authentication events.

At 313, the sampling module 623 samples the authentication graph to generate a plurality of random walk sequences. The sampling module 623 may sample the authentication graph via unbiased, fixed-length random walks. Specifically, for any node v in the graph, the sampling module 623 may explore r random walks with a fixed-length l. For a random walk starting from node v, let $v_i$ denote the ith node in the walk, the node sequence for this walk is generated with the above-described probability distribution (1), where E denotes the edge set in the graph, and $d_y$ is the degree of node y. This results in a set of random walk sequences $S=\{S_1, S_2, \ldots, S_m\}$, where $S_i$ denotes the ith random walk sequence, and m denotes the total number of sequences.

At 314, the embedding module 624 tunes node embeddings according to the plurality of random walk sequences. With the sequence set of the random walks, the embedding module 624 may tune node embeddings via the CBOW model with negative sampling. In the CBOW model, the target node provided context nodes from the random walk sequence may be predicted. Negative sampling may be utilized such that only the vectors of a subset of nodes that were not found in the particular context window of the target node may be updated.

By minimizing the loss value from Equation 4, the node embeddings may be tuned such that it is more likely to predict the target node embedding $h_T$ given the context node embeddings $h_f$, while simultaneously it is less likely to predict the negative sample node embeddings $h_U$ given the same context $h_f$.

The number of dimensions of the embeddings space for the node embeddings may be chosen according to various application scenarios. The number of dimensions of the embeddings space may be, for example, equal to or greater than 2, such as 2, 3, 4, or any other suitable positive integer. As an example, the node embeddings may be in a high-dimensional embedding space having the number of dimensions, e.g., equal to or greater than 128.

At 315, the training module 625 trains a link predictor. For example, the training module 625 may train a logistic regression link predictor using the node embeddings and ground-truth edge information from the authentication graph. For example, the training module 625 may train a logistic regression link predictor according to a dataset of true and false edge embeddings from the ground truth authentication graph. For example, the false edge set may be down sampled via a random sampling process, and training may be performed only on the same number of false edges as found in the true edge set. A link may be, for example, an edge in an authentication graph, which is a representation of an authentication event.

At 321, the log receiving module 621 receives industry standard authentication logs from the network log database 610 in the online detection stage. Based on the authentication logs, the authentication events may be extracted and parsed into a set of edges between authenticating entities.

At 322, the lookup module 629 performs an embedding lookup for the node embeddings generated in the above-described training stage. At 323, the link prediction module 626 performs a link prediction using the trained logistic regression link predictor (see 315). The link prediction module 626 may obtain values based on the logistic regression link predictor for authentication events, e.g. probability values for authentication events. For example, the link prediction module 626 may obtain a value based on the logistic regression link predictor for a particular authentication event occurring between two nodes a and b, e.g., a probability value for the particular authentication event occurring between two nodes a and b.

At 324, the anomaly detection module 627 performs anomaly detection according to the link prediction. The anomaly detection module 627 may perform anomaly detection via a (configurable) threshold value, where links below a particular probability threshold may be forwarded to security experts for investigation. The anomaly detection function A can be expressed as in above-described expression (9). A threshold 6 may be, for example, approximately 0.1 or 10%, but is not limited thereto. For example, in response to the probability value being less than a threshold, determine that A=1 and an anomaly is detected; in response to the probability value being equal to or greater than the threshold, determine that A=0 and an anomaly is not detected. Further, the anomaly detection module 627 may generate the anomaly graph 630. In one example, the anomaly graph 630 may be a type of authentication graph containing nodes and edges for which an anomaly is detected. In another example, the anomaly graph 630 may be a type of authentication graph containing only nodes and edges for which an anomaly is detected.

At 325, the security investigation module 628 forwards the authentication events below a particular probability threshold to security experts for investigation. Further, the security investigation module 628 may output the anomaly graph 630.

FIG. 7 illustrates a schematic view of an exemplary processing device 700 according to various embodiments. Referring to FIG. 7, the processing devices 700 includes one or more hardware processors 701 and one or more memories 702. The hardware processor 701 may include, for example, a micro-processor, a graphics processing unit, and/or a field-programmable gate array. The memory 702 may have program instructions stored thereon. By executing the program instructions, the one or more processors 701 performs methods consistent with the present disclosure.

4. RELATED WORK

This section studies the related works in terms of anomaly detection and node embedding methods.

Anomaly detection for APT identification has been extensively studied. However, the majority are based on expensive host-based log analysis, with the goal of anomalous process activity, indicative of malware or exploitation. Some go so far as mining information from user-driven commands for anomaly detection. While host logs may be available in some environments, it would be a significant burden for most large enterprises to capture and store verbose host-based logs such as system call traces.

At the network level, there are techniques for detecting web-based attacks, as well as botnet activity utilizing anomaly detection algorithms. A highly related technique combines host information with network information to detect lateral movement. However, they require process-level information from hosts, making this technique a poor fit at the enterprise scale. As lateral movement detection is such a hard problem, some approaches instead focus on detecting the degree to which environments are vulnerable to lateral movement attacks.

There are also approaches that look for deviations from known, specification-driven, rules of how an environment should behave, such as Holmes and Poirot. While these work reasonably well and are able to reduce false positives by explicitly defining what behavior is deemed malicious, they are still based on knowledge derived from a human, and thus risk circumvention by new and novel attack paths. In addition, these techniques require constant maintenance and upkeep to develop new specifications for the constantly evolving attack surface.

Node embedding methods aiming at learning representative embeddings for each node in a graph have been successfully applied to various downstream machine learning tasks, such as node classification, link prediction, and node recommendation. Existing methods usually take two steps to generate node embeddings. First, they sample meaningful paths to represent structural information in the graph. Second, they apply various data mining techniques from domains such as natural language processing (NLP), utilizing technologies such as word2vec for learning meaningful vector embeddings.

The major difference between existing methods lie in the first step, i.e., how to mine better paths to capture the most important graph information. In this context, the early work DeepWalk applies random walks to build paths for each node. In order to give more importance to close-by neighbors, Line instead applies a breadth-first search strategy, building two types of paths: one-hop neighbors and two-hop neighbors. Further, the authors of node2vec observe that the node embeddings should be decided by two kinds of similarities, homophily and structural equivalence. The homophily strategy would embed the nodes closely that are highly interconnected and in similar cluster or community, while the structural equivalence embeds the nodes closely that share similar structural roles in the graph. Based on these strategies, node2vec implements a biased random walk embedding process which is able to model both similarity measures.

There are additionally many other graph neural network architectures recently proposed, such as the convolution-based GCN, attention-based GAT, and many variants based on both. However, they are mostly designed for semi-supervised or supervised tasks, and are not as suitable for unsupervised learning as the random-walk based approaches mentioned previously.

5. EMBODIMENTS

One limitation can be explainability, which is not specific to our technique, but rather a limitation of machine learning techniques in general. When our graph learning algorithms label an event as an anomaly, it is relatively challenging to determine why it has done so. There is current and active research on explaining machine learning and artificial intelligence (AI) algorithms, and many even specific to explaining the results of graph learning algorithms in particular. We may potentially be able to use some of these techniques which would allow us to identify what nodes were most important when generating both the embedding, and ultimately the link prediction scores.

Our detection algorithm is based on the assumption that we will have historic data for each entity we plan to perform link prediction on in the future. If we have never seen an entity authenticate before, then we will not have an embedding generated for that entity, and thus we will be unable to perform the link prediction. There are many ways to handle this problem, such as assigning new entities a generic "new node" embedding, or assigning the new node embedding to the average embedding of its neighbors (provided that they have embeddings themselves), however we have not explored the impact of these various approaches. We believe that, at least in the case of enterprise network authentication, it is a fair assumption to believe that for the vast majority of user accounts in the network, there should be some history of their behavior provided a long enough historic window.

In this work we focused specifically on log data pertaining to authentication events. However, there is a myriad of additional data that we could add to our graph and ultimately to our graph learning algorithms. In potential embodiments, we plan to add finer grained detail of actions performed by users, such as DNS requests and file-share accesses. This will allow us to also expand our detection algorithm to identify other stages of the killchain beyond lateral movement, such as command and control traffic, which would likely cause anomalous DNS requests.

6. CONCLUSION

In this work we discussed the challenging problem of detecting lateral movement of APT-level adversaries within enterprise computer networks. We explained why existing signature-based intrusion detection techniques are insufficient, and existing behavioral analytics are too fine grained. We introduced our technique of abstracting a computer network to a graph of authenticating entities, and performing unsupervised graph learning to generate node behavior embeddings. We discussed how we use these embeddings to perform link prediction, and ultimately anomaly detection for malicious authentication events. We applied our techniques to a simulated as well as a real-world dataset and were able to detect anomalous authentication links with both increased true positive rates, and decreased false positive rates, overrule-based heuristics and non-graph ML anomaly detectors. We analyzed the results of our algorithm, and developed several simple filters to further reduce the false positive rate of our technique.

In this paper we present a technique for detecting lateral movement of Advanced Persistent Threats inside enterprise-level computer networks using unsupervised graph learning. Our detection technique utilizes information derived from industry standard logging practices, rendering it immediately deployable to real-world enterprise networks. Importantly, this technique is fully unsupervised, not requiring any labeled training data, making it highly generalizable to different environments. The approach consists of two core components: an authentication graph, and an unsupervised graph-based machine learning pipeline which learns latent representations of the authenticating entities, and subsequently performs anomaly detection by identifying low-probability authentication events via a learned logistic regression link predictor. We apply this technique to authentication data derived from two contrasting data sources: a small-scale simulated environment, and a large-scale real-world environment. We are able to detect malicious authentication events associated with lateral movement with a true positive rate of 85% and false positive rate of 0.9%, compared to 72% and 4.4% by traditional rule-based heuristics and non-graph anomaly detection algorithms. In addition, we have designed several filters to further reduce the false positive rate by nearly 40%, while reducing true positives by less than 1%.

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand without regard to the location of such computing resources in order to perform a variety computing functions that include storing and/or processing computing data.

This available storage and processing power may be leveraged to enable innovative services which help link users and retailers and provide a seamless experience. With today's communication networks, cloud computing infrastructures help drive innovative user experiences by linking the sensing and user interface capabilities of smartphones and the processing and storage capabilities of the cloud. Users are able to access a variety of services and web sites to search for and locate products across the world and at home. For example, a user may input a particular brand and style of a shirt into a search engine and purchase the shirt off an internet retailer. However, it can be difficult to determine whether a particular item of clothing purchased online and sight unseen is really suitable and there may be issues with sizing, fitment, look, etc. Moreover, it may be difficult to determine the particular brand or style in the first place, especially where users want a particular look with less of an emphasis on brand.

The system and method of the present invention may include operation by one or more processing devices, such as the processing device 700 including the processor 701 and the memory 702. It is noted that the processing device can be any suitable device, such as a computer, server, mainframe, processor, microprocessor, controller, PC, tablet, smartphone, or the like. The processing devices can be used in combination with other suitable components, such as a display device (monitor, LED screen, digital screen, etc.), memory device, input device (touchscreen, keyboard, pointing device such as a mouse), wireless module (for RF, Bluetooth, infrared, WiFi, etc.). The information may be stored on a computer medium such as a computer hard drive, on a CD ROM disk or on any other appropriate data storage device, which can be located at or in communication with the processing device.

The system and method of the present invention is implemented by computer software that permits the accessing of data from an electronic information source. The software and the information in accordance with the invention may be within a single, free-standing computer or it may be in a central computer networked to a group of other computers or other electronic devices. The information may be stored on a computer hard drive, on a CD ROM disk or on any other appropriate data storage device.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. A system, comprising:
a log receiving module configured to receive a first plurality of network-level authentication logs having unique identifiers associated with users and services in a network, the network having a plurality of network entities each entity associated with a node, said first plurality of network-level authentication logs further having source Internet-Protocol addresses of a plurality of authentication entities from the plurality of network entities that request authentication, and a second plurality of network-level authentication logs having unique identifiers associated with a plurality of authentication events subject to an anomaly detection;
an authentication graph module configured to generate, according to the first plurality of network-level authentication logs, a network-level authentication graph of all the plurality of authenticating entities, wherein the authentication graph is a graph with a node type mapping and an edge type mapping for all of the nodes;
a sampling module configured to sample the authentication graph to generate a plurality of node sequences each including a sequence of nodes;
an embedding module configured to tune a plurality of node embeddings according to the plurality of node sequences, wherein each node embedding is a vector representation for a node;
a training module configured to train a link predictor according to the plurality of node embeddings and ground-truth edge information from the authentication graph;
a link prediction module configured to apply the link predictor to perform a link prediction on each of the plurality of authentication events subject to the anomaly detection; and
an anomaly detection module configured to perform anomaly detection of anomalous authentication between entities, wherein the anomaly detection detects lateral movement within the network of any of the plurality of authentication entities.

2. The system of claim 1, wherein the log receiving module is configured to:
receive the first plurality of network-level authentication logs in an offline stage; and
receive the second plurality of network-level authentication logs in an online stage.

3. The system of claim 1, wherein the authentication graph includes nodes that represent authenticating entities, and edges that represent authentication events.

4. The system of claim 3, wherein the authenticating entities include machines, users, and/or software.

5. The system of claim 1, wherein the vector representation for each node captures degree of behavior of each node within the network as a whole.

6. The system of claim 1, wherein the plurality of node embeddings are in a high-dimensional embedding space having the number of dimensions equal to or greater than 128.

7. The system of claim 1, wherein the training module is configured to train the link predictor according to a dataset of true edge embeddings and a dataset of false edge embeddings from the ground-truth edge information.

8. The system of claim 1, wherein the link prediction module is configured to apply the link predictor to each of the plurality of authentication events subject to an anomaly detection to obtain a probability value of each of the plurality of the authentication event.

9. The system of claim 8, wherein the plurality of authentication events subject to an anomaly detection are extracted and parsed into a set of edges between authenticating entities.

10. The system of claim 9, further comprising a lookup module configured to perform an embedding lookup for the node embeddings for the authenticating entities.

11. The system of claim 8, the anomaly detection module is configured to:
in response to the probability value being less than a threshold, determine that an anomaly is detected; and
in response to the probability value being equal to or greater than the threshold, determine that the anomaly is not detected.

12. The system of claim 11, wherein the threshold is approximately 10%.

13. The system of claim 11, wherein the anomaly detection module is further configured to generate an anomaly graph containing information about anomalous authentication events.

14. The system of claim 13, further comprising a security investigation module configured to forward the authentication event having a probability value below the threshold to security experts for investigation.

15. The system of claim 1, wherein the sampling module is configured to sample the authentication graph via unbiased, fixed-length random walks.

16. The system of claim 1, wherein said training module is further configured to train a graph machine learning model via a random-walks and continuous-bag-of-words embedding on the authentication graph data structure.

17. The system of claim 1, wherein the plurality of authenticating entities include client and service principals as observed during Kerberos authentication, and said anomaly detection module is based on the client and service principals, and the source Internet-Protocol addresses of the client and service principals.

18. The system of claim 1, wherein said anomaly detection module is based on an unsupervised node embedding based on random walk sampling and continuous-bag-of-words embedding to detect lateral movement within the network.

19. The system of claim 1, wherein said anomaly detection module is based on node embedding to detect lateral movement within the network.

20. The system of claim 1, wherein said anomaly detection module is based on link prediction from said link prediction module to detect lateral movement within the network.

* * * * *